Dec. 30, 1969

A. J. BERGVALL 3,487,143

APPARATUS AND METHOD FOR THE CONTINUOUS
CASTING OF POLYURETHANE FLAT BELTING

Filed Nov. 30, 1966

INVENTOR.
ARDELL J. BERGVALL
BY
James P. Lindsay
ATTY.

United States Patent Office 3,487,143
Patented Dec. 30, 1969

3,487,143
APPARATUS AND METHOD FOR THE CONTINUOUS CASTING OF POLYURETHANE FLAT BELTING
Ardell J. Bergvall, Akron, Ohio, assignor to The B. F. Goodrich Company, New York, N.Y., a corporation of New York
Filed Nov. 30, 1966, Ser. No. 598,036
Int. Cl. B29c 7/14, 7/02
U.S. Cl. 264—216                                    5 Claims

ABSTRACT OF THE DISCLOSURE

Polyurethane belting is cast continuously between opposed spaced-apart conveyor belts moving vertically downwardly at the same speed, the liquid polyurethane mix being introduced between the moving conveyor belts as they come together in said opposed spaced relationship and being set by heat during the downward travel of said opposed spaced conveyor belts before the separation of said conveyor belts.

---

The present invention relates to the continuous manufacture of polyurethane flat belting and pertains more particularly to the continuous casting of polyurethane flat belting between opposed spaced conveyor belts while they are moving in a vertically downward path at a constant speed.

It was proposed heretofore to continuously cast polyurethane flat belting between horizontally moving spaced conveyor belts. However, it has been found that such a process is not entirely satisfactory for the commercial manufacture of such belting. One difficulty which was encountered resulted from sagging of the horizontally disposed conveyor belts between which the polyurethane was cast because of the inability to adequately support the opposing reaches of the belts against sagging. As a consequence, the thickness of the cast belting was not uniform. Also, difficulty was experienced in obtaining complete filling of the space between the opposed belt surfaces. As a result, voids often resulted in the finished product. Attempts to force the liquid polyurethane mix under greater pressure into the space between the opposed faces of the belts to insure complete filling of the space proved to be an inadequate solution to this difficulty since a back flow of the liquid polyurethane mix occurred at the mouth formed by the converging conveyor belts as they come together in the said opposed spaced relationship. A further objection to the casting of polyurethane belting between horizontally disposed conveyor belts is that the incorporation of fabric or other reinforcement in the cast belting is difficult to achieve.

The present invention overcomes the above-mentioned difficulties and provides an economical and practical process for the commercial manufacture of high quality cast polyurethane flat belting useful for any application to which flat belting customarily is put, for example, as conveyor belting. In accordance with the present invention, a liquid polyurethane mix continuously is deposited between adjacent opposed spaced reaches of a pair of conveyor belts which are moving continuously in a vertically downwardly direction in such spaced relationship at the same speed. The polyurethane mix is set by heating while confined between said moving spaced conveyor belts and is withdrawn as cast belting as the said conveyor belts part from each other to be returned to the charging end of the apparatus for recycling. If desirable, the cast flat belting can be "cured" further by a subsequent heat treatment after it has been set as described above. For example, the cast belting after being withdrawn from between the said conveyor belts can be advanced through a heating oven to cause further cure of the polyurethane polymer.

Figure 2:
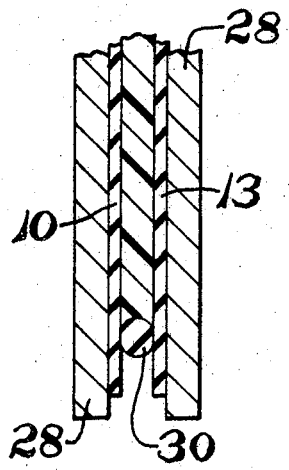
Figure 1:
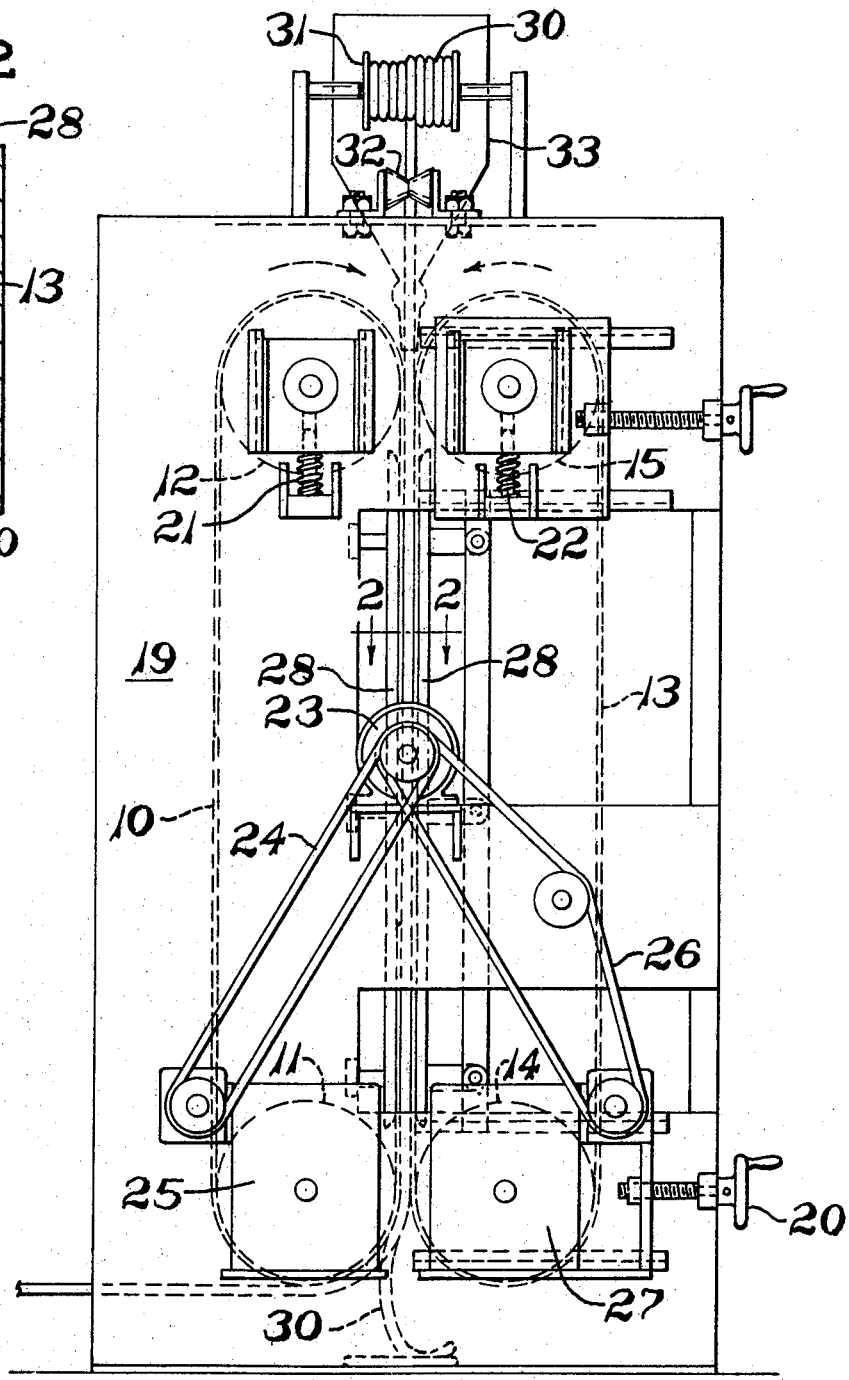
Figure 3:
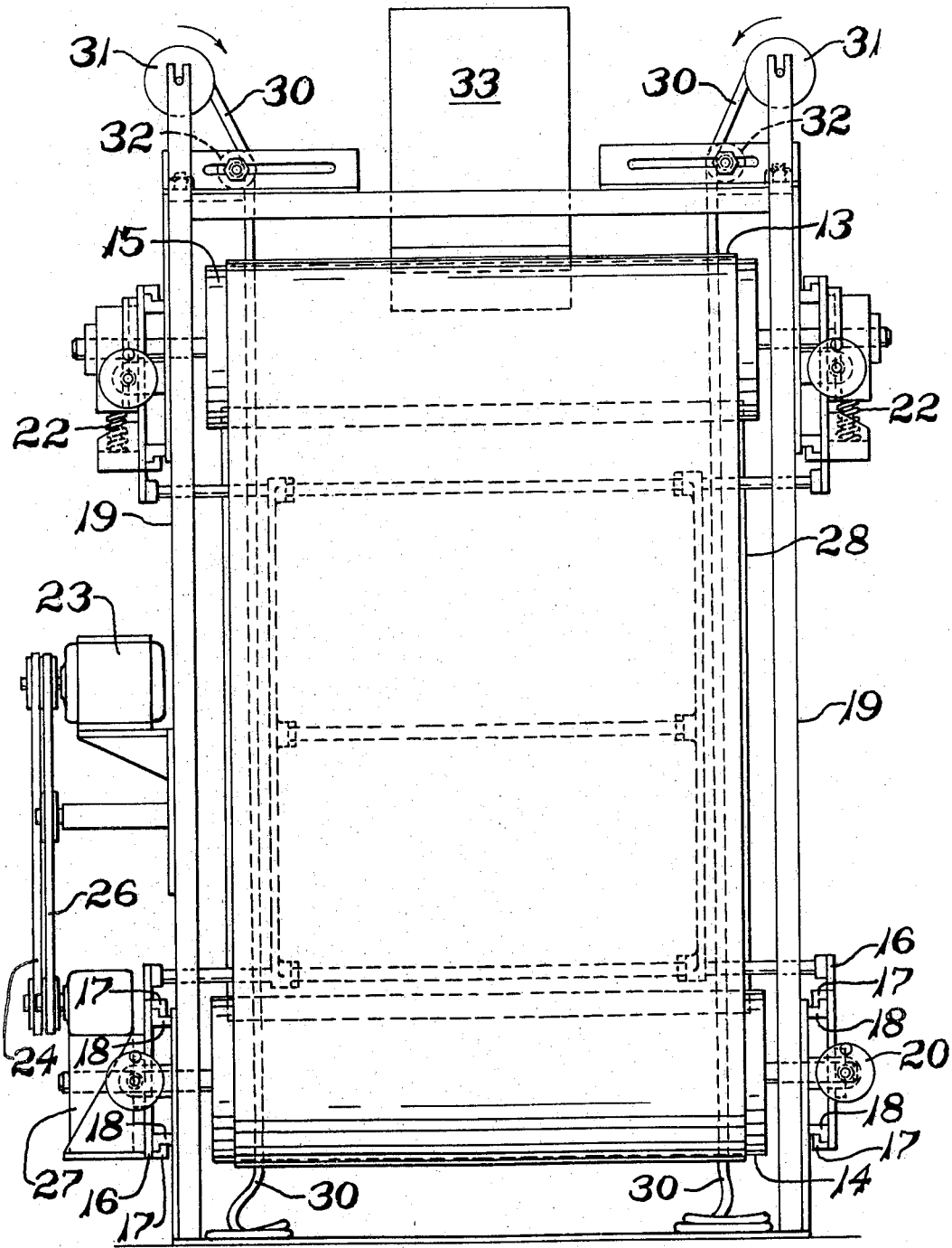

The invention will be more fully understood from the following detailed description of an embodiment of this invention and by referring to the accompanying drawings in which:

FIG. 1 is a side elevation view of apparatus within the purview of this invention;
FIG. 2 is a section on line 2—2 of FIG. 1; and
FIG. 3 is a front elevation view of the apparatus shown in FIG. 1.

Referring to the drawings, the apparatus there depicted for continuously casting polyurethane flat belting from a liquid polyurethane prepolymer mix comprises a conveyor belt 10 which is carried around drive roll 11 and idler roll 12, and a conveyor belt 13 which is carried around drive roll 14 and idler roll 15. As shown clearly in FIG. 1, idler roll 12 is positioned vertically above drive roll 11 with the axes of both rolls within a common vertical plane, and idler roll 15 is positioned vertically above drive roll 14 with the axes of rolls 14 and 15 within a common vertical plane, the two said planes being parallel. Such arrangement provides that adjacent opposing reaches of conveyor belts 10 and 13 may be spaced a desired distance apart provided idler rolls 12 and 15 are spaced a proper distance apart and drive rolls 11 and 14 likewise are spaced a proper distance apart. To allow for the desired spaced-apart distance between the adjacent opposed reaches of conveyor belts 10 and 13, drive roll 14 is mounted on frames 16, 16 that are provided with flanges 17, 17 which form channels within which flanges 18, 18 mounted on frames 19, 19 slidably ride. Movement of drive roll 14 toward or away from drive roll 11 to vary the spacing between the adjacent opposed reaches of conveyor belts 10 and 13 is effected by turning threaded hand crank 20. Idler roll 15 is similarly mounted for movement toward or away from idler roll 12. Tensioning springs 21 constantly urge idler roll 12 away from drive roll 11 and thereby maintain conveyor belt 10 taut. In like manner, tensioning springs 22, 22 constantly urge idler roll 15 away from drive roll 14 and maintain conveyor belt 13 taut.

The conveyor belts 10 and 13 are driven at the same speed by motor 23, power being transmitted to drive roll 11 through belt 24 to gear box 25 that contains gearing (not shown) which meshes with a gear (not shown) mounted on the shaft of drive roll 11 and power being transmitted to drive roll 14 through belt 26 to gear box 27 that contains gearing (not shown) which meshes with a gear (not shown) mounted on the shaft of drive roll 14. The drive rolls 11 and 14 are driven in opposite rotation so that the opposed reaches of conveyor belts 10 and 13 move together in a vertically downward direction.

Heating platens 28, 28 (heated preferably electrically) provide heat to conveyor belts 10 and 13 which heat is transmitted to the polyurethane mix deposited between belts 10 and 13, as will be explained in greater detail hereinafter. Platens 28, 28 also function as supports that prevent the opposing reaches of belts 10 and 13 from moving farther apart during their downward travel so as to insure that a constant thickness of belting is cast.

Resilient rubber strips or ropes 30, 30 are fed between the opposed reaches of conveyor belts 10 and 13 as the conveyor belts are advanced. The diameter of ropes 30, 30 must be at least equal to, and preferably slightly greater than, the spacing between the adjacent opposed reaches of conveyor belts 10 and 13, since the ropes 30, 30 function to bridge the space between the opposed reaches of belts 10 and 13 and prevent the liquid polyurethane mix from flowing out from between the spaced belts 10 and 13 at the sides before the mix is set. The spacing between ropes 30, 30 also determines the width of the belting being cast. As illustrated in the drawing, the ropes 30, 30 are drawn off of spools 31, 31 and over guides 32, 32 which guides are mounted for adjustment toward or away from each other so that the width of belting being cast can be changed if desired. While the ropes 30, 30 are shown merely to be deposited in a heap on the floor after their travel through the apparatus, it will be appreciated that the ropes can be recycled for re-use if desired. Also, it will be appreciated that, in place of the ropes 30, 30, strips of material can be permanently attached to belts 10 and 13 to bridge between belts 10 and 13 and prevent liquid mix from flowing out from between the belts, although with such an arrangement the width of belting being cast then cannot be changed without replacing belts 10 and 13 and the thickness of belting that can be cast is limited. Consequently, the use of resilient strips 30, 30 which are not attached to either belt 10 or belt 13 is preferred.

The liquid polyurethane mix is deposited between the spaced opposed reaches of conveyor belts 10 and 13 through hopper 33 which has its discharge end located within the V-shaped trough formed between and by the conveyor belts 10 and 13 as they converge toward their opposed spaced apart relationship. In place of the hopper 33, the liquid polyurethane mix can be deposited between the spaced opposed reaches of conveyor belts 10 and 13 directly from a polyurethane mixing head in which the components of the prepolymer mix are mixed.

In utilizing the above-described apparatus, the spacing between the adjacent opposed reaches of belts 10 and 13 is adjusted to the thickness of belting desired to be cast and the spacing between the resilient ropes 30, 30 is adjusted so as to produce a cast belting of desired width. Ropes 30, 30 then are fed between the opposed spaced belts 10 and 13 in the desired spaced relationship and motor 23 is started so that belts 10 and 13 are put into travel. A piece of previously cast belting, or other material (such as a piece of vulcanized rubber sheet), having a width and thickness equal to the width and thickness of belting set to be cast is introduced between the downwardly moving opposed spaced reaches of belts 10 and 13 and functions as a "plug" to prevent the initial charge of liquid polyurethane mix from flowing rapidly through the space between belts 10 and 13 before it can be set. (This "plug" is cut from the roll of cast belting product produced and is discarded.) Next, liquid polyurethane mix is introduced into the V-shaped trough formed by the converging belts 10 and 13 at a rate sufficient that the spacing between the opposed spaced reaches of the belts 10 and 13 is filled with the casting mix within a short distance (generally 4–5 inches) below the point at which the downwardly moving reaches of belts 10 and 13 first form the desired opposed spaced-apart relationship. As the downwardly moving reaches of belts 10 and 13 advance, the liquid polyurethane mix is carried between the heating platens 28, 28 and is set soon after being exposed to the heat and before the downwardly moving reaches of belts 10 and 13 commence to diverge from each other as they begin their travel around drive rolls 11 and 14 respectively. The "set" polyurethane belting then may be rolled onto a reel or, if it is desired to cure the polyurethane further, may be fed into a heating oven.

If a reinforcing fabric or reinforcing cords are desired to be incorporated into the cast belting, such reinforcement can be fed between the adjacent opposed spaced belts 10 and 13 so as to be combined with the liquid polyurethane mix and be permanently incorporated in the belting when the mix is set.

If desired, the side edges of the cast belting may be trimmed after the belting is withdrawn from the above-described continuous casting apparatus.

It will be appreciated that the casing of belting in accordance with this invention is continuous so long as liquid polyurethane mix continuously is fed between the downwardly moving opposed spaced belts 10 and 13. The belting may be cut to any convenient length and has been found particularly useful for making conveyor belts.

Any heat-settable liquid polyurethane mix which produces a flexible product can be employed in the making of belting in accordance with this invention. Usually, commercial flexible polyurethanes are produced from a mixture of a diisocyanate (such as toluene diisocyanate) and a hydroxyl-terminated polyester or polyether. The liquid polyurethane mixes from which a flexible cast belting could be produced are well known to the art and, consequently, need not be discussed in detail herein.

The rate at which the polyurethane mix introduced between the opposed reaches of belts 10 and 13 is set can be increased by increasing the amount of heat supplied to the mix by platens 28, 28. If the degree of set is insufficient when the conveyor belts 10 and 13 are moving at a particular speed, the condition can be remedied by increasing the temperature of the platens 28, 28 and/or by slowing down the speed at which belts 10 and 13 are travelling. The degree of set also can be increased by the addition of a catalyst to the polyurethane mix.

The conveyor belts 10 and 13 may be formed of any convenient material, although conveyor belts made of fiber glass which has been coated with a tetrafluoroethylene polymer (Teflon polymer, for example) have proven particularly suitable.

I claim:

1. Apparatus for continuously casting flexible polyurethane belting from a liquid polyurethane mix which apparatus comprises a conveyor belt carried around a drive roll and an idler roll mounted vertically above said drive roll with its axis of rotation within the same vertical plane as the axis of rotation of said drive roll, a second conveyor belt carried around a second drive roll and a second idler roll mounted vertically above said second drive roll with its axis of rotation within the same vertical plane as the axis of rotation of said second drive roll, the said vertical plane in which the axes of rotation of the second said drive roll and second said idler roll lie being parallel to the said vertical plane in which the axes of rotation of the first said drive roll and first said idler roll lie whereby said conveyor belts are positioned in opposed parallel relationship, means for driving said drive rolls in opposite directions of rotation and such that the adjacent opposed reaches of said conveyor belts move vertically downwardly, means for moving the second said drive roll relative to the first said drive roll and means for moving the second said idler roll relative to the first said idler roll whereby the spacing between the adjacent opposed parallel reaches of said conveyor belts can be varied to provide for the casting of different thicknesses of belting, resilient strip members spaced from each other and interposed between the spaced-apart adjacent opposed reaches of said conveyor belts and movable with said conveyor belts for bridging the space between said opposed reaches of said conveyor belts to confine liquid polyurethane mix deposited in the space between said opposed reaches of said conveyor belts within such space, means for depositing a liquid polyurethane mix within the space between said adjacent opposed spaced reaches of said conveyor belts at a location close to the position at which said conveyor belts converge together to form said spaced relationship, and means for heating said liquid polyurethane mix as it is confined within the space between the said adjacent opposed spaced-apart reaches of said conveyor belts and being moved by said conveyor belts vertically downwardly to cause said liquid polyurethane mix to set.

2. The apparatus of claim 1 in which there is provided means for adjusting the spacing between said strip members that bridge the said space between the said adjacent opposed spaced-apart reaches of said conveyor belts whereby the width of belting being cast in said apparatus can be varied.

3. The apparatus of claim 1 in which said strip members that bridge the said space between the said adjacent opposed spaced-apart reaches of said conveyor belts have a thickness slightly greater than the space between the said adjacent opposed spaced-apart reaches of said conveyor belts.

4. The apparatus of claim 1 in which said heating means are platens which also support the adjacent opposed reaches of said conveyor belts to prevent the reaches of belting from becoming spread further apart with respect to each other as they move vertically downward.

5. The process for the continuous casting of polyurethane belting from a liquid polyurethane mix which comprises continuously advancing adjacent opposed reaches of two adjacent conveyor belts vertically downwardly in spaced-apart relationship with resilient strip members spaced-apart from each other bridging the space between the said spaced-apart reaches of said conveyor belts and traveling with said opposed reaches of said conveyor belts, continuously introducing a liquid polyurethane mix into the said space between the opposed reaches of said conveyor belts and between said spaced-apart bridging strips as said reaches of said belts are advanced downwardly, and heating said liquid polyurethane mix while it is confined between said spaced-apart reaches of said conveyor belts and being advanced in a vertically downward direction by said moving conveyor belts until said polyurethane mix is set.

References Cited

UNITED STATES PATENTS

| | | | |
|---|---|---|---|
| 1,416,483 | 5/1922 | Loveland | 264—212 |
| 2,075,735 | 3/1937 | Loomis | 264—175 |
| 2,515,243 | 7/1950 | Lyon | 264—175 |
| 2,817,875 | 12/1957 | Harris et al. | 264—216 |
| 3,170,972 | 2/1965 | Knipp et al. | 264—176 |
| 3,422,178 | 1/1969 | Junker et al. | 264—51 |

ROBERT F. WHITE, Primary Examiner

J. R. THURLOW, Assistant Examiner

U.S. Cl. X.R.

18—4, 5, 6; 264—51, 166, 331